US005548754A

United States Patent [19]
Pirahesh et al.

[11] Patent Number: 5,548,754
[45] Date of Patent: Aug. 20, 1996

[54] OPTIMIZATION OF SQL QUERIES USING EARLY-OUT JOIN TRANSFORMATIONS

[75] Inventors: Mir H. Pirahesh; Ting Y. Leung; Guy M. Lohman; Eugene J. Shekita; David E. Simmen, all of San Jose, Calif.

[73] Assignee: International Business Machines Corporation, Armonk, N.Y.

[21] Appl. No.: 385,177

[22] Filed: Feb. 7, 1995

[51] Int. Cl.$^6$ .................................................. G06F 17/30
[52] U.S. Cl. ..................... 395/600; 395/700; 364/974; 364/974.6; 364/282.1; 364/DIG. 2
[58] Field of Search ..................................... 395/600, 700

[56] References Cited

U.S. PATENT DOCUMENTS

| | | | |
|---|---|---|---|
| 4,506,326 | 3/1985 | Shaw et al. | 395/700 |
| 4,769,772 | 9/1988 | Dwyer | 395/600 |
| 4,829,427 | 5/1989 | Green | 395/600 |
| 5,091,852 | 2/1992 | Tsunchida et al. | 395/600 |
| 5,317,742 | 5/1994 | Bapat | 395/700 |
| 5,367,675 | 11/1994 | Cheng et al. | 395/600 |

OTHER PUBLICATIONS

Haas et al., "Extensible Query Processing in Starburst", IBM Almaden Research Center, San Jose, CA (US), ACM 1989, pp. 377–388.
Date, C. J. & Darwen, Hugh., "Relational Database Management" *Relational Database Writings 1989–1991*, Part II, pp. 133–154.
Pirahesh et al., "Extensible/Rule Based Query Rewrite Optimization in Starburst", IBM Almaden Research Center, San Jose, CA (US), *ACM Sigmond*, Jun. 1992, pp. 39–48.
Paulley et al., "Exploiting Uniqueness in Query Optimization", Department of computer Science, University of Waterloo, Ontario, Canada, *IEEE* 1994, pp. 68–79.
Lohman et al., Research Report—"Query Processing in R*", IBM Research Laboratory, San Jose, CA (US) IBM Research Division, Apr. 1984, pp. 1–33.
Agrawal et al., "Composition of Database Relations", Proceedings Fifth International Conference on Data Engineering, 6–10 Feb. 1989, Los Angles California, pp. 102–108.
Wei et al., "Hot–Spot Based Composition Algorithm", Eighth International Conference on Data Engineering, 2–3 Feb. 1992, Tempe, Arizona, pp. 48–55.

*Primary Examiner*—Paul V. Kulik
*Assistant Examiner*—Paul R. Lintz
*Attorney, Agent, or Firm*—Merchant, Gould, Smith, Edell, Welter & Schmidt

[57] ABSTRACT

A method and apparatus for optimizing SQL queries in a relational database management system uses early-out join transformations. An early-out join comprises a many-to-one existential join, wherein the join scans an inner table for a match for each row of the outer table and terminates the scan for each row of the outer table when a single match is found in the inner table. To transform a many-to-many join to an early-out join, the query must include a requirement for distinctiveness, either explicitly or implicitly, in one or more result columns for the join operation. Distinctiveness can be specified using the DISTINCT keyword in the SELECT clause or can be implied from the predicates present in the query. The early-out join transformation also requires that no columns of the inner table be referenced after the join, or if an inner table column is referenced after the join, that each referenced column be "bound". A referenced column can be bound in one of three ways: (1) an inner table column can be bound to a constant through an equality predicate, (2) an inner table column can be bound to an outer table column, or (3) an inner table column can be bound to a correlated value, wherein the correlated value originates outside the query block. In all three cases, an inner table column can be bound through the transitivity of equality predicates.

9 Claims, 5 Drawing Sheets

OPTIMIZATION OF SQL QUERIES USING EARLY-OUT JOIN TRANSFORMATIONS

BACKGROUND OF THE INVENTION

1. Field of the Invention

This invention relates in general to database management systems performed by computers, and in particular, to the optimization of SQL queries in a relational database management system using early-out join transformations.

2. Description of Related Art

Relational DataBase Management System (RDBMS) software using a Structured Query Language (SQL) interface is well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

One of the most important operations in the execution of SQL queries is the join of two or more tables. However, performing joins operations can be quite costly in terms of performance, because each row in a first table must be joined with multiple rows in a second table. Thus, techniques have been developed for optimizing SQL query expressions involving joins. Researchers, including the applicants of the present invention, have performed pioneering work in this area, for example, as reflected in the following publication: Hamid Pirahesh, Joseph Hellerstein, and Waqar Hasan, "Extensible/Rule Based Query Rewrite Optimization in STARBURST," *Proceedings of ACM SIGMOD '92 International Conference on Management of Data*, San Diego, Calif. 1992, (hereinafter referred to as "[PIRA92]"). Nonetheless, there exists a need in the art for additional optimization techniques for join operations.

SUMMARY OF THE INVENTION

To overcome the limitations in the prior art described above, and to overcome other limitations that will become apparent upon reading and understanding the present specification, the present invention discloses a method and apparatus for optimizing SQL queries. An object of the present invention is to optimize many-to-many joins in SQL queries using early-out join transformations. An early-out join comprises a many-to-one existential join, wherein the join scans an inner table for a match for each row of an outer table and terminates the scan for each row of the outer table when the match is found in the inner table. To transform a join to an early-out join, the query must include a requirement for distinctiveness, either explicitly or implicitly, in one or more result columns for the join operation. Distinctiveness can be explicitly specified using the DISTINCT keyword in the SELECT clause, or can be implicitly specified from the predicates present in the query. The early-out join transformation also requires that no columns of the inner table be referenced after the join, or if an inner table column is referenced after the join, that each referenced column be "bound". A referenced column can be bound in one of three ways: (1) an inner table column can be bound to a constant through an equality predicate, (2) an inner table column can be bound to an outer table column, or (3) an inner table column can be bound to a correlated value, wherein the correlated value originates outside the query block. In all three cases, an inner table column can be bound through the transitivity of equality predicates.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

ENVIRONMENT

Figure 1:
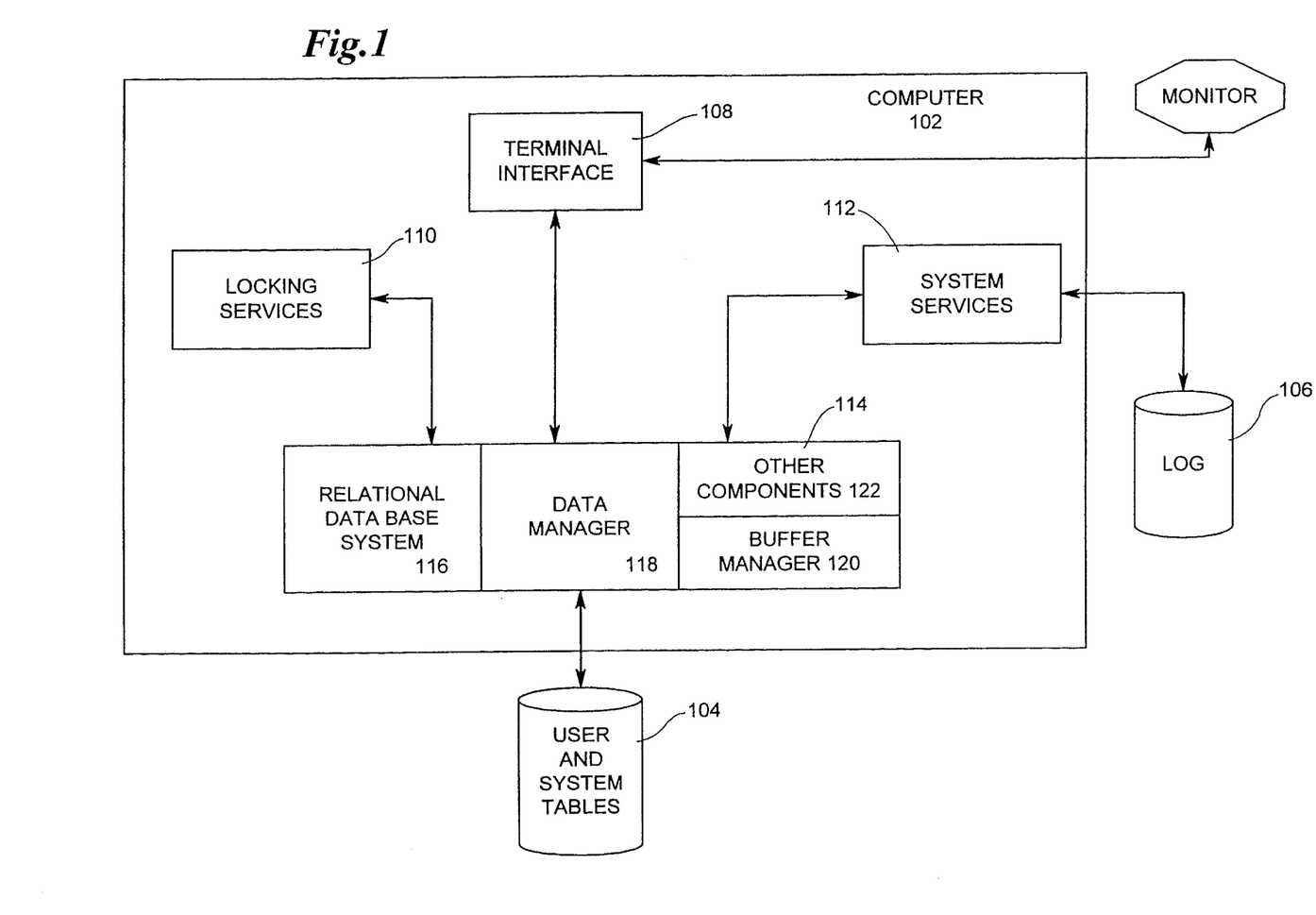
FIG. 1 illustrates the computer hardware environment of the present invention.

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more relational databases.

Operators of the computer system 102 use a standard operator interface 108, such as IMS/DB/DC, CICS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

Figure 2:
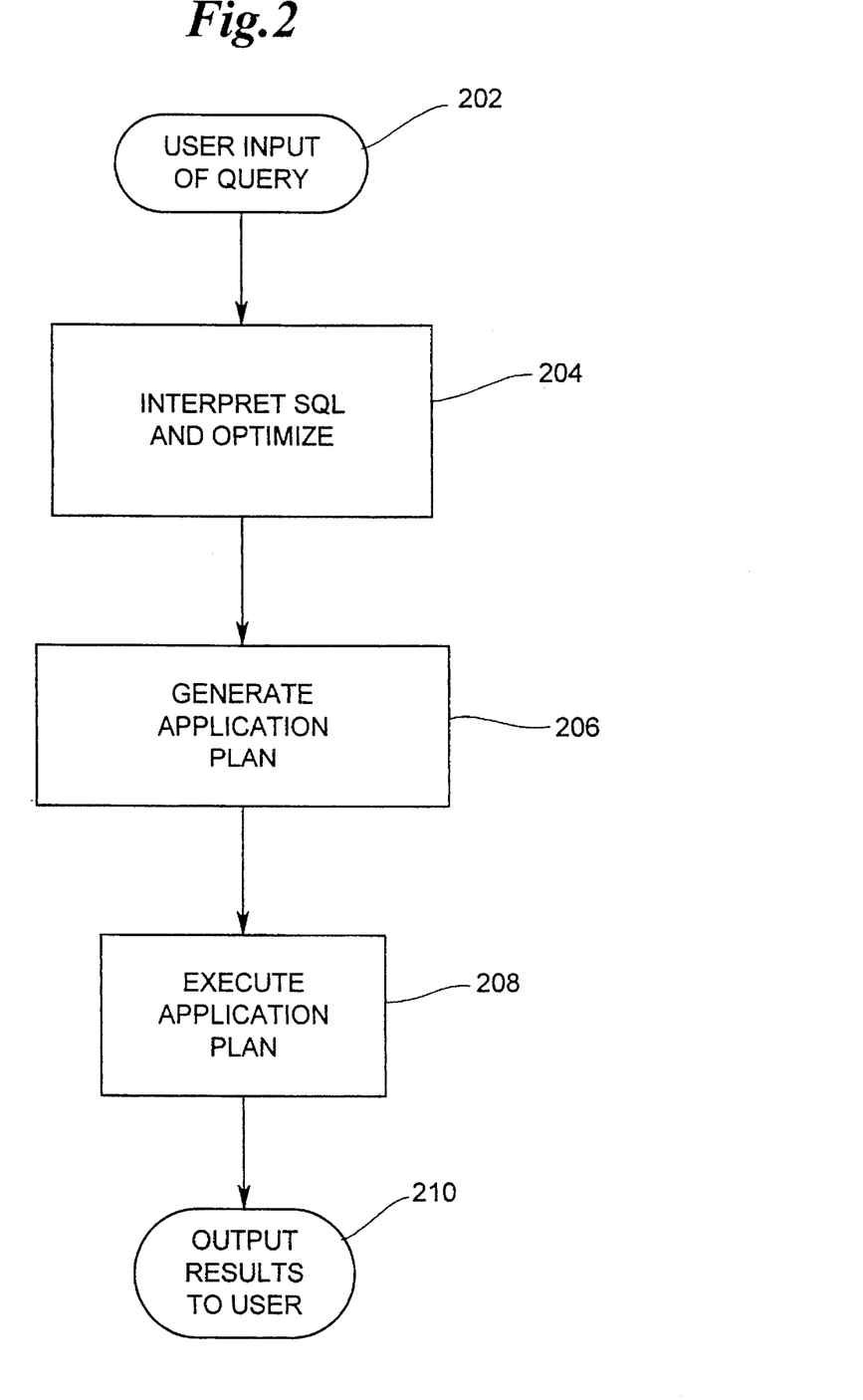
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

Figure 3:
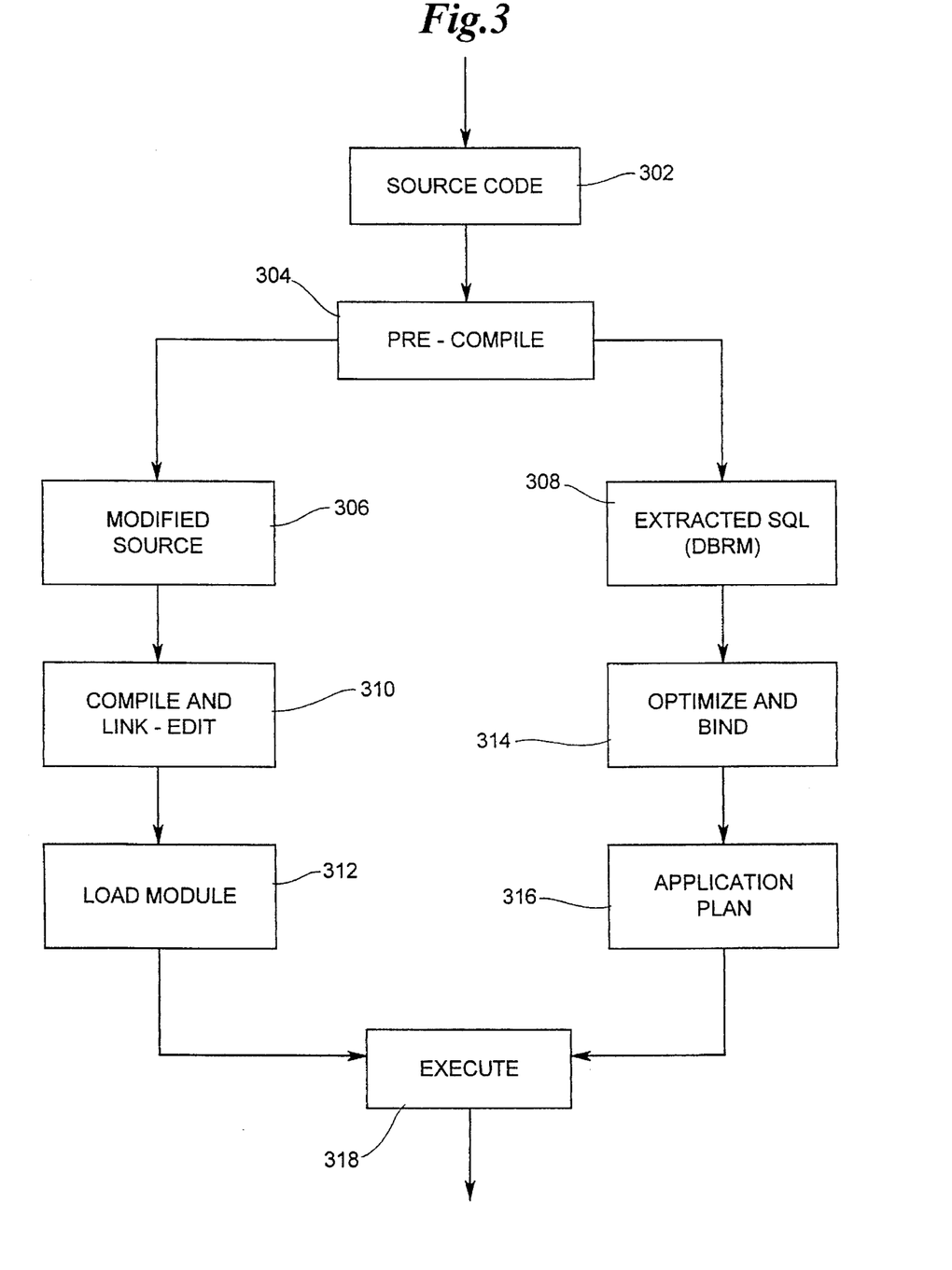
FIG. 3 is a flowchart illustrating the steps necessary for the interpretation and execution of SQL statements embedded in source code according to the present invention.

FIG. 3 is a flowchart illustrating the steps necessary for the interpretation and execution of SQL statements embedded in source code according to the present invention. Block 302 represents program source code containing a host language (such as COBOL or C) and embedded SQL statements. The program source code is then input to a pre-compile step 304. There are two outputs from the pre-compile step 304: a modified source module 306 and a Database Request Module (DBRM) 308. The modified source module 306 contains host language calls to DB2, which the pre-compile step 304 inserts in place of SQL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SQL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

DEFINITIONS

Following are definitions for a number of terms used in SQL queries. These definitions are required for an understanding of later portions of the present specification.

SELECT Statement

In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required. The result of a SELECT statement is a subset of data retrieved by the RDBMS software from one or more existing tables or views stored in the relational database, wherein the FROM clause tells the RDBMS software the name of the table or view from which data is being selected. The subset of data is treated as a new table, termed the result table, which typically comprises a temporary table. In general, the items specified in the SELECT clause of the SELECT statement determine the columns that will be returned in the result table from the table(s) identified in the FROM clause.

DISTINCT Keyword

The DISTINCT keyword may be used in the SELECT clause to eliminate what would be duplicate rows in the result table. Although the DISTINCT keyword may only be specified in the SELECT clause, it affects the rows that are returned, but not the columns. The DISTINCT keyword acts upon the intermediate result set, so that each row of the result table is unique. The default ALL keyword has the opposite effect in that it returns all rows, including duplicates.

WHERE Clause

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

Join Operation

A join operation makes it possible to combine tables or views by combining rows from one table or view to another table or view. The rows, or portions of rows, from the different tables or views are concatenated horizontally. The join operation is usually implied by naming more than one table or view in the FROM clause of a SELECT statement. Although not required, join operations normally include a WHERE clause that identifies the columns through which the rows can be combined. The WHERE clause may also include a predicate comprising one or more conditional operators that are used to select the rows to be joined.

EARLY-OUT JOIN TRANSFORMATIONS

The present invention discloses a method for optimizing SQL queries using early-out join transformations (EOJT). The present invention is able to detect when a many-to-many join operation can be transformed into a faster, many-to-one existential join operation. The term "many-to-many" means that each row in an outer table joins with all matching rows in an inner table, and the term "many-to-one" means that each row in the outer table joins with at most one matching row in the inner table. The end result is that query execution plans produced using EOJT can execute up to an order of magnitude faster.

As an example, let R×S denote the join of tables R and S. The left-most table R is termed the outer table and the right-most table S is termed the inner table. In a join operation, each row in R may join to several rows in S, and vice versa, which is referred to as a many-to-many join. Suppose, for example, that R and S are joined by the following query:

| SELECT | R.ID, S.ID |
| --- | --- |
| FROM | R, S |
| WHERE | R.X = S.X |

Further, suppose that R and S have the following column values:

| R.ID | R.X | S.X | S.ID |
| --- | --- | --- | --- |
| R1 | 1 | 1 | S1 |
| R2 | 1 | 1 | S2 |
| R3 | 2 | 2 | S3 |
| R4 | 2 | 3 | S4 |
| R5 | 3 | 3 | S5 |

In this example, the ID columns are used to uniquely identify each row in R and S. The result of the query is:

| R.ID | S.ID |
| --- | --- |
| R1 | S1 |
| R1 | S2 |
| R2 | S1 |
| R2 | S2 |
| R3 | S3 |
| R4 | S3 |
| R5 | S4 |
| R5 | S5 |

This result is an example of a many-to-many join, because each row in R joins with one or more matching rows in S, and vice versa.

In another example, the query could include an explicit DISTINCT keyword:

| SELECT | DISTINCT R.ID |
| --- | --- |
| FROM | R, S |
| WHERE | R.X = S.X |

In this example, the DISTINCT keyword causes duplicate rows in the result table to be discarded. Consequently, the RDBMS software needs only to check if each row in R matches a row in S, i.e., whether there exists a single matching row in S. However, in the prior art, the RDBMS software would first match all the rows in R and S, and then later apply the DISTINCT keyword to the intermediate result table to discard duplicate rows. As a result, the RDBMS software would perform unnecessary and costly operations.

In the present invention, an early-out join can be used to compute the join of R and S. Using the early-out join, row R1 would be output as soon as the RDBMS software detects that it joins with row S1, and no check would be made by the RDBMS software to see if row R1 joins with any other rows in S, i.e., row S2. Similar functions would be performed by the RDBMS software for the remaining rows in R.

One of the most important applications of early-out join transformations arise in subquery-to-join transformation. For example, consider the following query:

| SELECT | R.ID, R.X | |
| --- | --- | --- |
| FROM | R | |
| WHERE | R.X = ANY | (SELECT S.X |
| | | FROM S |
| | | WHERE S.X > 1) |

This query includes the subquery "SELECT S.X . . . " To improve performance, this subquery can be transformed by the RDBMS software, as described in [PIRA92] incorporated by reference herein, into:

| SELECT | DISTINCT R.ID, R.X |
| --- | --- |
| FROM | R, S |
| WHERE | R.X = S.X |
| AND | S.X > 1 |

Applying the same logic as the previous example, an early-out join can then be used by the RDBMS software to execute the join of R and S.

The advantage of using an early-out join over a more general many-to-many join is improved performance. Each row in the outer table only has to be joined with at most one row in the inner table. Consequently, less rows need to be joined. Furthermore, duplicate elimination for the final DISTINCT keyword, e.g., via sorting or other means, is avoided. This is because no duplicates for the outer table are ever introduced using EJOT.

IMPLEMENTATION

Figure 4:
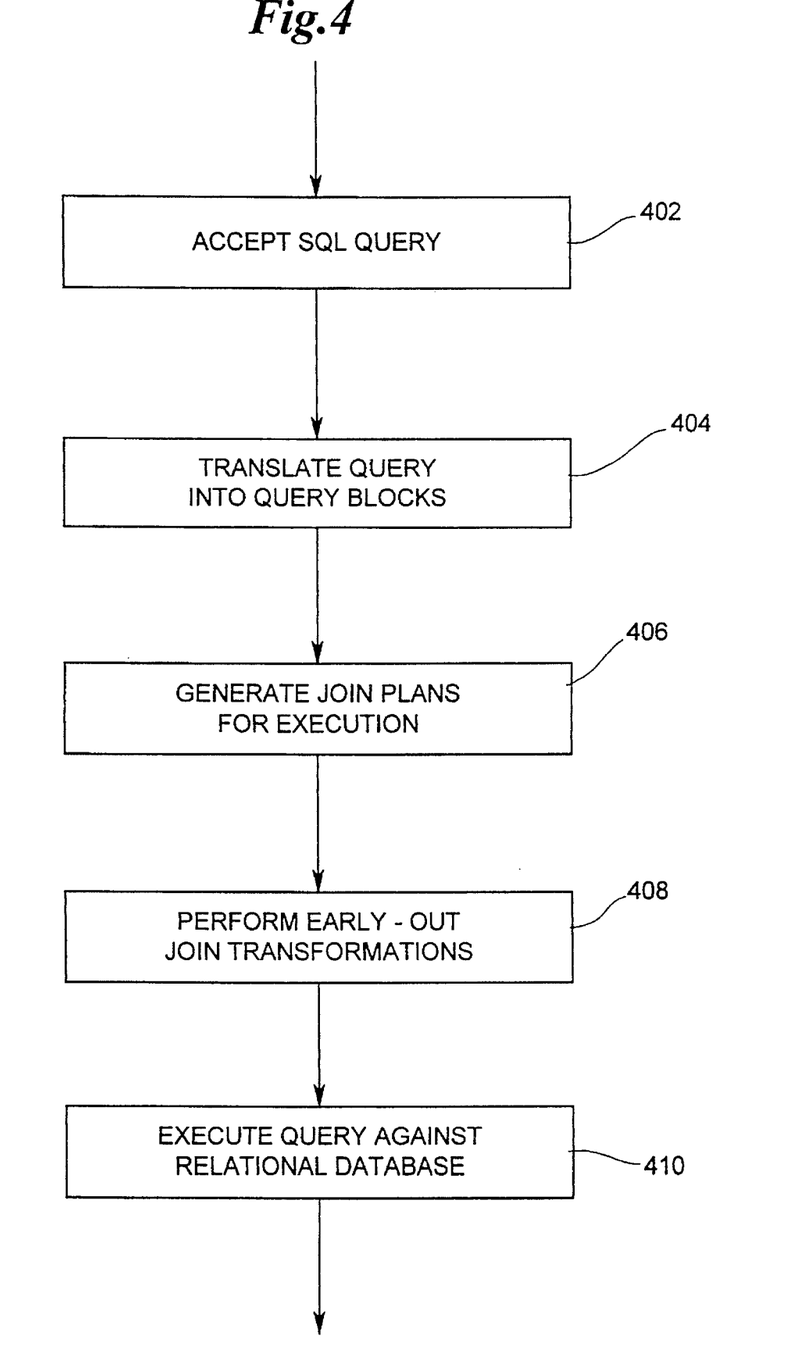
FIG. 4 is a flowchart illustrating the method of optimizing SQL queries according to the present invention.

FIG. 4 is a flowchart illustrating the method of optimizing SQL queries according to the present invention. Block 402 represents the acceptance of the SQL query (either interactively from the user or extracted from program source code). Block 404 represents the translation of the query into one or more query blocks, which are representations of the outer query and any subqueries or inner queries within the outer query, wherein the query blocks are an internal representation of the user's query maintained in the memory of the computer system 102 by the RDBMS software. Block 406 represents the generation of join plans from the query blocks. Block 408 represents the RDBMS software performing the early-out join transformations for the join plans, as described in more detail in conjunction with FIG. 5. Finally, block 410 represents the execution of the query blocks against the relational database and the output of the result table to the operator.

Figure 5:
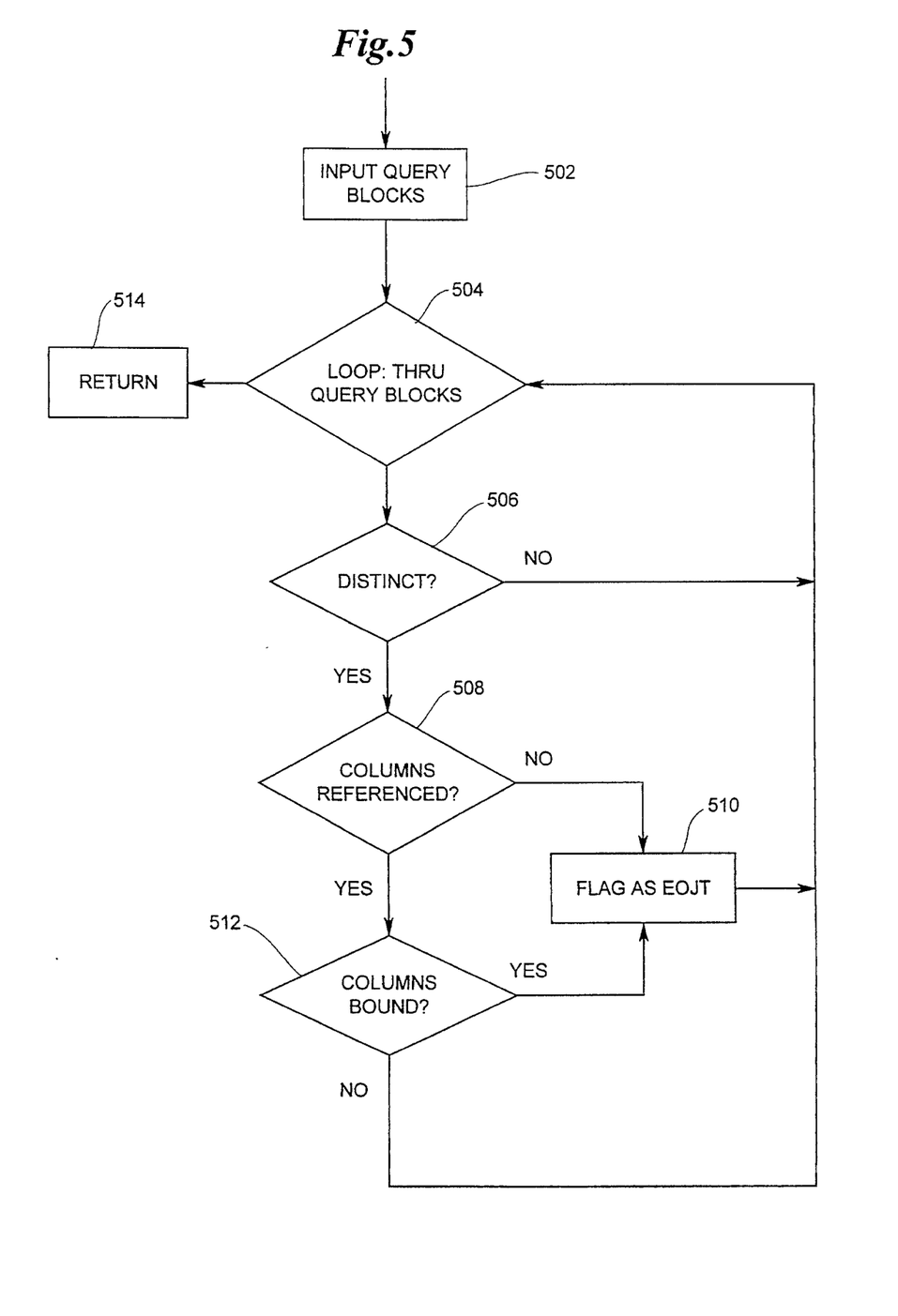
FIG. 5 is a flowchart illustrating the method of performing early-out join transformations according to the present invention.

FIG. 5 is a flowchart illustrating the method of performing early-out transformations according to the present invention, wherein the RDBMS software first examines the context in which the outer and inner tables are being joined and, if the right conditions are satisfied, then marking the join as an early-out join.

Block 502 represents the input of the query blocks and block 504 represents a loop to examine every join found in the query blocks.

Block 506 is a decision block that represents the RDBMS software determining whether the query block includes a requirement for distinctiveness in one or more result columns for the join operation. Distinctiveness can be specified using the DISTINCT keyword in the SELECT clause, or it can be implied from the predicates present in the query block and thus added to the query block by an automated query transformation performed by the RDBMS software, as described in [PIRA92] incorporated by reference herein. If there is no requirement for distinctiveness, then the join cannot be transformed into an early-out join, and thus control transfers from block 506 to block 504 to examine other query blocks. On the other hand, if there is a requirement for distinctiveness in the query block, then the RDBMS software must check that other conditions are satisfied before the join can be transformed into an early-out join, and thus control transfers from block 506 to block 508.

Block 508 is a decision block that represents the RDBMS software examining the query block to determine whether one or more columns of the inner table are referenced after the join operation is performed. According to the present invention, if no columns in the inner table are referenced after the join, then the join can be transformed into an early-out join, and thus control transfers from block 508 to block 510. On the other hand, if columns in the inner table are referenced after the join, then the RDBMS software must check that further conditions are satisfied before the join can be transformed into an early-out join, and thus control transfers from block 508 to block 512.

Block 512 is a decision block that represents the RDBMS software examining the query block to determine whether the columns of the inner table referenced after the join operation are "bound," but are not used in any length-sensitive expressions that have yet to be evaluated (e.g., LENGTH(C) expressions). A referenced column of the inner table can be bound in any one of three ways:

(a) A column of the inner table can be bound to a constant through an equality predicate. For example, the predicate S.X=10 makes the inner table column S.X bound to the constant 10.

(b) A column of the inner table can be bound to a column of the outer table. For example, the predicate R.X=S.X makes the inner table column S.X bound, if R.X belongs to the outer table.

(c) A column of the inner table can be bound to a correlated column through an equality predicate, wherein the correlated column itself is bound. For example, the predicate T.X=S.X makes the inner table column S.X bound, if T.X is a correlated value that originates in another query block.

The need for satisfying the conditions at blocks 506 and 508 is fairly straightforward. However, the need for satisfying conditions (a), (b) and (c) at block 512 is more subtle. Examples are provided below to illustrate why the conditions (a), (b), and (c) need to be satisfied.

Referring again to the tables R and S used in earlier examples, and again assuming that R is the outer table and S is the inner table in a join of R and S:

| R.ID | R.X | S.X | S.ID |
|------|-----|-----|------|
| R1   | 1   | 1   | S1   |
| R2   | 1   | 1   | S2   |
| R3   | 2   | 2   | S3   |
| R4   | 2   | 3   | S4   |
| R5   | 3   | 3   | S5   |

Assume that the following query is performed against tables R and S:

| SELECT | DISTINCT S.ID |
|--------|---------------|
| FROM   | R, S          |
| WHERE  | R.X = S.X     |

For this query, again suppose R is the outer table and S is the inner table, and the result table of the query without an early-out join is:

| S.ID |
|------|
| S1   |
| S2   |
| S3   |
| S4   |
| S5   |

Looking at the result table, it should be obvious that an early-out join cannot be used here. If an early-out join was used, the following incorrect result table would be produced:

| S.ID |
|------|
| S1   |
| S3   |
| S4   |

The wrong result table is produced with an early-out join because a non-bound column from the inner table, namely S.ID, is referenced in the SELECT clause, which occurs after the join. Consequently, each row in R must be joined to all matching rows in S. Otherwise, column values from S.ID that affect the final result table will be missing.

A simple example that illustrates condition (a) from block 512 is provided below:

| SELECT | DISTINCT S.ID |
|--------|---------------|
| FROM   | R, S          |
| WHERE  | R.X = S.X     |
| AND    | S.ID = S1     |

In this example, even though inner table column S.ID is referenced after the join in the SELECT clause, only one value for S.ID can join to a given row in R, i.e., S.ID=S1. Consequently, there is no chance that an early-out join can miss a value for S.ID that affects the final result table.

An example that illustrates condition (b) from block 512 is provided below:

| SELECT | DISTINCT R.ID, S.X |
|--------|--------------------|
| FROM   | R, S               |
| WHERE  | R.X = S.X          |

In this example, column S.X of the inner table is referenced after the join in the SELECT clause, but it is bound to column R.X of the outer table, and thus only one value for S.X can join to a given row in R, i.e., R.X=S.X. So, as in the previous example, there is no chance that an early-out join can miss a value for S.X that affects the final result table.

Turning now to one final example that illustrates condition (c) from block 512, assume that a third table T with columns T.X and T.Y is added to the query. Also assume that table S includes a column S.Y. An example query is provided below:

```
SELECT   T.X
FROM     T
WHERE    T.X NOT IN   (SELECT S.Y
                       FROM R, S
                       WHERE R.X = S.X
                       AND T.Y = S.Y
```

In this example, an early-out join can be used on the subquery or inner query block (i.e., "SELECT S.Y . . . "), even though the inner table column S.Y is referenced after the join in the subquery's SELECT clause. In the context of the subquery, the inner table column S.Y is bound to the correlated value T.Y, which does not change for each execution of the subquery. Therefore, the inner table column S.Y is treated as though it were bound to a constant value.

For conditions (a), (b), and (c) of block 512, note that the transitivity of equality predicates can also bind a column. For example, the predicates R.X=T.X and T.X=S.X imply that R.X=S.X. Therefore, if R.X is a column of the outer table and S.X is a column of the inner table, then S.X is bound in accordance with condition (b) of block 512.

For each inner column that is referenced after the join, if any of the conditions (a), (b), or (c) are satisfied at block 512, then the join can be transformed into an early-out join, and thus control transfers from block 512 to block 510. On the other hand, for each inner column that is referenced after the join, if the conditions (a), (b), and (c) are not satisfied, then the join cannot be transformed into an early-out join, and thus control transfers from block 512 to block 504 to examine other query blocks.

Block 512 represents the RDBMS software marking the join as an early-out join. Marking the join as an early-out join may be as simple as the RDBMS software setting a flag in the memory of the computer system 102 to indicate that the associated join can be performed as an early-out join. Of course, those skilled in the art will recognize that numerous other methods could also be used to indicate that the join is an early-out join without departing from the scope of the present invention. For example, the join could be identified as an early-out join by inserting an early-out join mnemonic or opcode into the query block.

After all query blocks have been examined, control transfers from block 504 to 514 to return to block 408 of FIG. 4, and the query blocks are executed by the RDBMS software against the relational database at block 410 of FIG. 4. Generally, the steps for performing the early-out joins are independent of the steps for performing joins. For example, the steps for performing the early-out joins may be implemented for both nested-loop joins and sort-merge join. When the join is actually executed, a check is made to see if the join is an early-out join, e.g., by examining the flag associated with the join. If so, then the steps performed by the RDBMS software in executing the join operation must ensure that at most one match from the inner table is output for each row of the outer table in the join. Typically, a trivial extension to the steps performed by the RDBMS software in executing join operations is required to support the execution of early-out join operations.

Finally, note that, although single-table examples have been used throughout the present specification, the EOJT generalizes to the case when both the outer and inner tables are composite tables, i.e., the result of one or more previous joins.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method for optimizing SQL queries containing joins using early-out join transformations. The EOJT is used during query optimization to detect when a many-to-many join can be transformed into a many-to-one existential join. The end result is that query execution plans produced using EOJT can run up to an order of magnitude faster than those produced without such transformations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing an SQL query in a computer having a memory, the SQL query being performed by the computer to retrieve data from a relational database stored in an electronic storage device coupled to the computer, and the SQL query including a join operation for an outer table and an inner table in the relational database, the method comprising the steps of:

(a) examining the query in the memory of the computer to determine whether the query includes a requirement for distinctiveness in one or more result columns of the join operation;

(b) examining the query in the memory of the computer to determine whether one or more columns of the inner table are referenced in the query after the join operation is performed by the computer; and (c) performing, in the memory of the computer, an early-out join operation in place of the join operation when the query includes the requirement for distinctiveness and no columns of the inner table are referenced after the join operation, further comprising the steps of scanning the inner table for a match for each row of the outer table and terminating the scanning step when the match is found.

2. The method of claim 1, wherein the requirement for distinctiveness in the result columns for the join operation is explicitly set forth in the query.

3. The method of claim 1, wherein the requirement for distinctiveness in the result columns for the join operation is implicitly set forth in the query.

4. An apparatus for optimizing an SQL query, comprising:

(a) a computer having a memory and an electronic storage device coupled thereto, wherein the electronic storage device stores a relational database;

(b) means, performed by the computer, for accepting an SQL query into the memory of the computer, the SQL query including a join operation for an outer table and an inner table stored in the relational database;

(c) means, performed by the computer, for examining the query in the memory of the computer to determine whether the query includes a requirement for distinctiveness in one or more result columns of the join operation;

(d) means, performed by the computer, for examining the query in the memory of the computer to determine whether one or more columns of the inner table are referenced in the query after the join operation is performed; and (e) means, performed by the computer, for executing an early-out join operation in place of the join operation when the query includes the requirement for distinctiveness and no columns of the inner table are referenced after the join operation, the means for executing further comprising means for retrieving the inner and outer tables from the relational database stored in the electronic storage device, means for storing the inner and outer tables in the memory of the computer, means for scanning the inner table in the memory of the computer for a match for each row of the outer table, and means for terminating the means for scanning when the match is found.

5. The apparatus of claim 4, wherein the requirement for distinctiveness in the result columns for the join operation is explicitly set forth in the query.

6. The apparatus of claim 4, wherein the requirement for distinctiveness in the result columns for the join operation is implicitly set forth in the query.

7. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, and the SQL query including a join operation for an outer table and an inner table in the relational database, the method comprising the steps of:

(a) examining the query in the memory of the computer to determine whether the query includes a requirement for distinctiveness in one or more result columns of the join operation;

(b) examining the query in the memory of the computer to determine whether one or more columns of the inner table are referenced in the query after the join operation is performed by the computer; and (c) performing, in the memory of the computer, an early-out join operation in place of the join operation when the query includes the requirement for distinctiveness and no columns of the inner table are referenced after the join operation, further comprising the steps of scanning the inner table for a match for each row of the outer table and terminating the scanning seep when the match is found.

8. The program storage device of claim 7, wherein the requirement for distinctiveness in the result columns for the join operation is explicitly set forth in the query.

9. The program storage device of claim 7, wherein the requirement for distinctiveness in the result columns for the join operation is implicitly set forth in the query.

* * * * *

UNITED STATES PATENT AND TRADEMARK OFFICE
CERTIFICATE OF CORRECTION

PATENT NO. : 5,548,754

DATED : August 20, 1996

INVENTOR(S) : Mir H. Pirahesh, et al.

It is certified that error appears in the above-identified patent and that said Letters Patent is hereby corrected as shown below:

```
Column 12, line 19, after "scanning" change "seep" to

--step--.
```

Signed and Sealed this

Twenty-fifth Day of February, 1997

Attest:

BRUCE LEHMAN

Attesting Officer

Commissioner of Patents and Trademarks